United States Patent [19]

Blose

[11] 4,161,332
[45] Jul. 17, 1979

[54] DOVETAIL CONNECTION FOR PIN AND BOX JOINTS

[75] Inventor: Thomas L. Blose, Houston, Tex.

[73] Assignee: Hydril Company, Los Angeles, Calif.

[21] Appl. No.: 914,162

[22] Filed: Jun. 9, 1978

Related U.S. Application Data

[63] Continuation of Ser. No. 679,476, Apr. 22, 1976, abandoned.

[51] Int. Cl.² ............................................. F16L 25/00
[52] U.S. Cl. .................................... 285/334; 285/347
[58] Field of Search ............... 285/333, 334, 355, 340, 285/347; 403/343

[56] References Cited

U.S. PATENT DOCUMENTS

| 2,079,692 | 5/1937 | Lapointe | 285/334 X |
| 2,211,179 | 8/1940 | Stone | 285/334 |
| 3,100,656 | 8/1963 | MacArthur | 285/333 X |
| 3,224,799 | 12/1965 | Blose et al. | 285/334 |
| 3,508,771 | 4/1970 | Duret | 285/334 |
| 3,667,784 | 6/1972 | Hokanson et al. | 285/334 |

FOREIGN PATENT DOCUMENTS 262796  1/1971  U.S.S.R. .................................. 285/334

Primary Examiner—Dave W. Arola
Attorney, Agent, or Firm—William W. Haefliger

[57] ABSTRACT

A pipe joint includes pin and box members having interengaged two-step threads and interengaged annular shoulders preventing radial and axial separation of the members.

15 Claims, 8 Drawing Figures

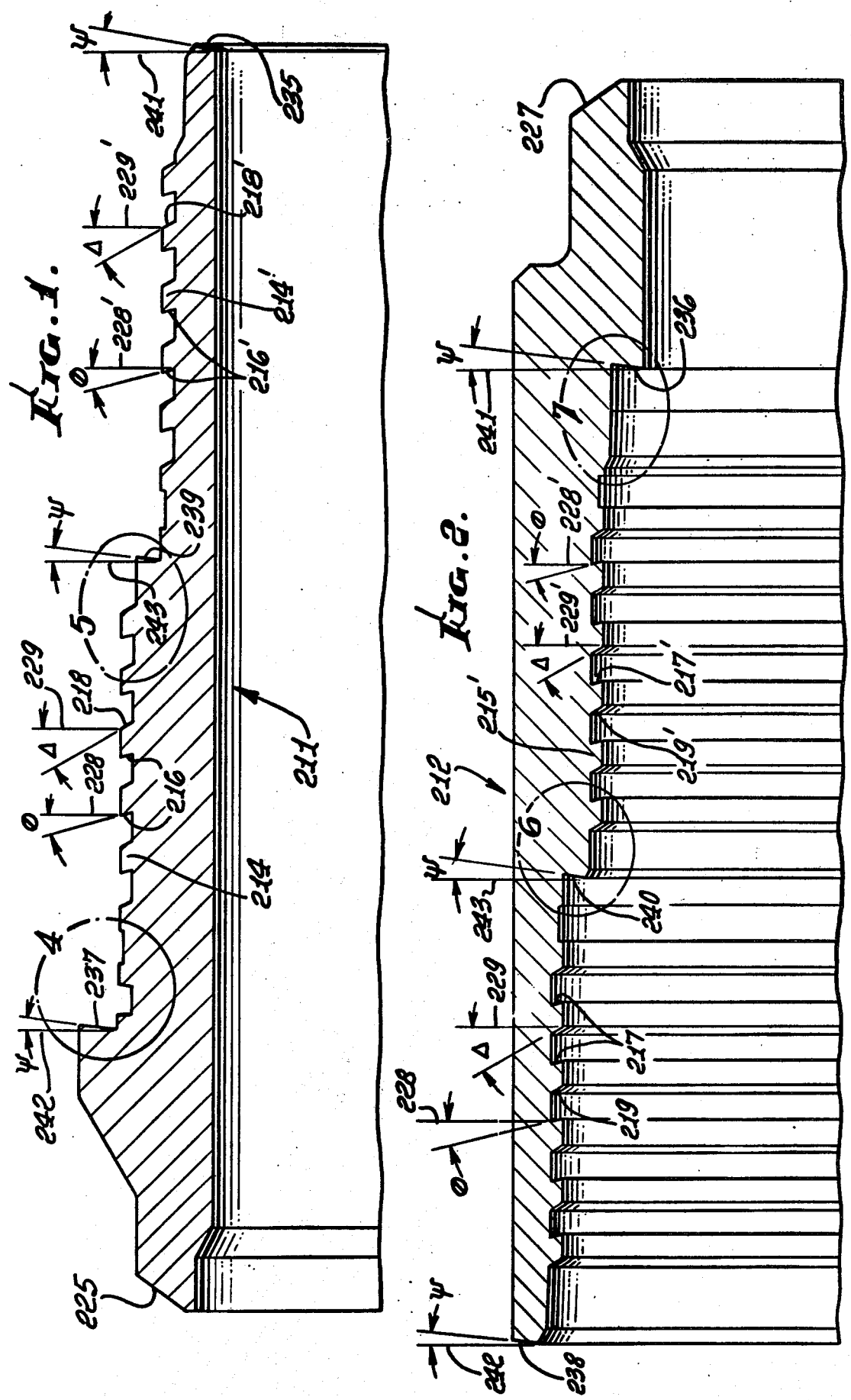

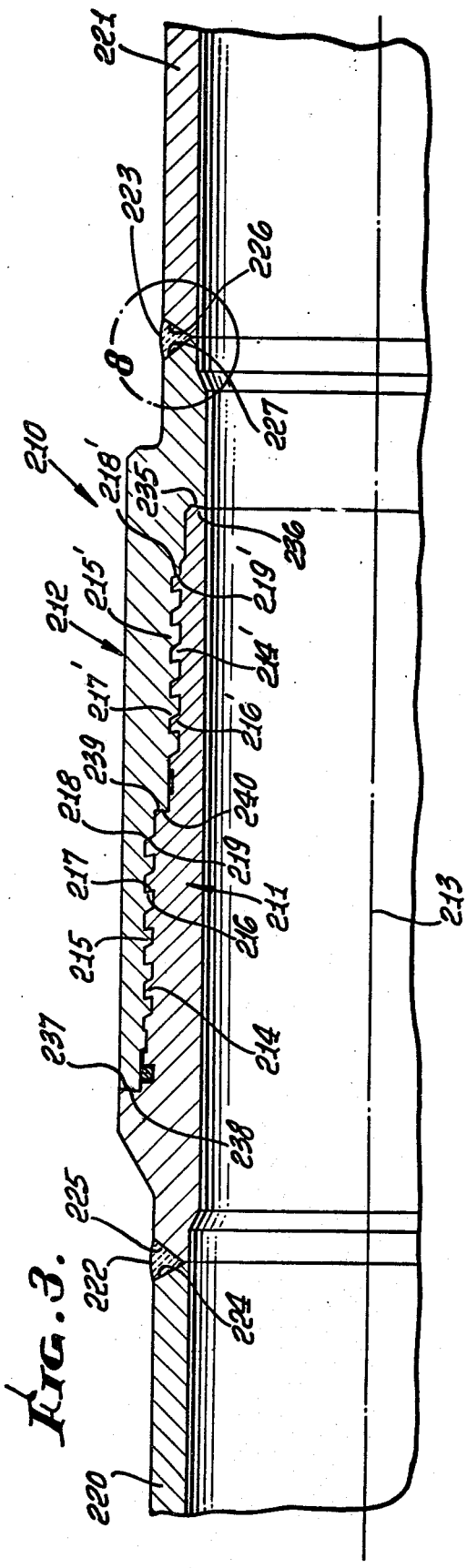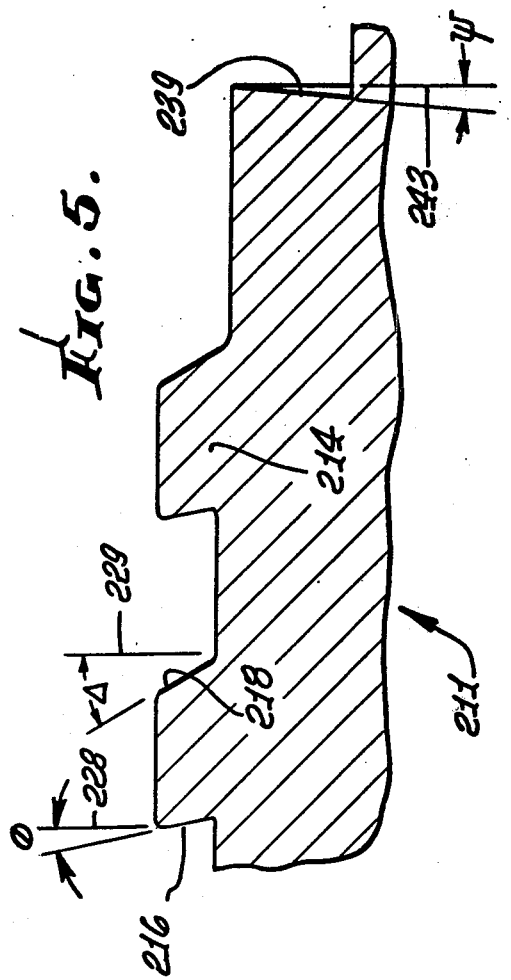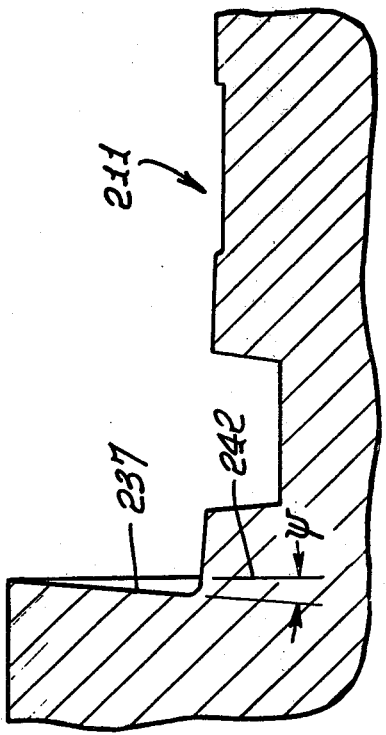

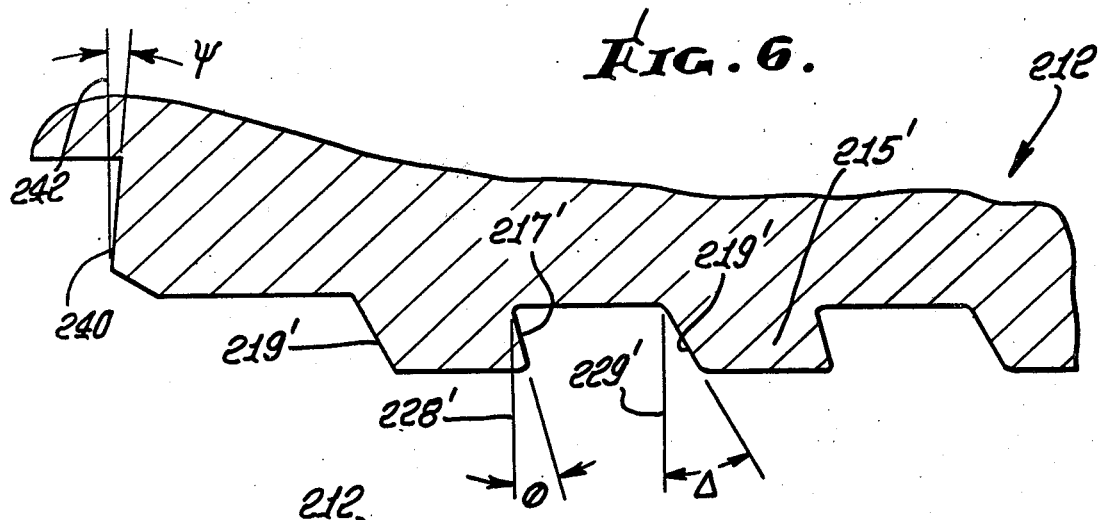
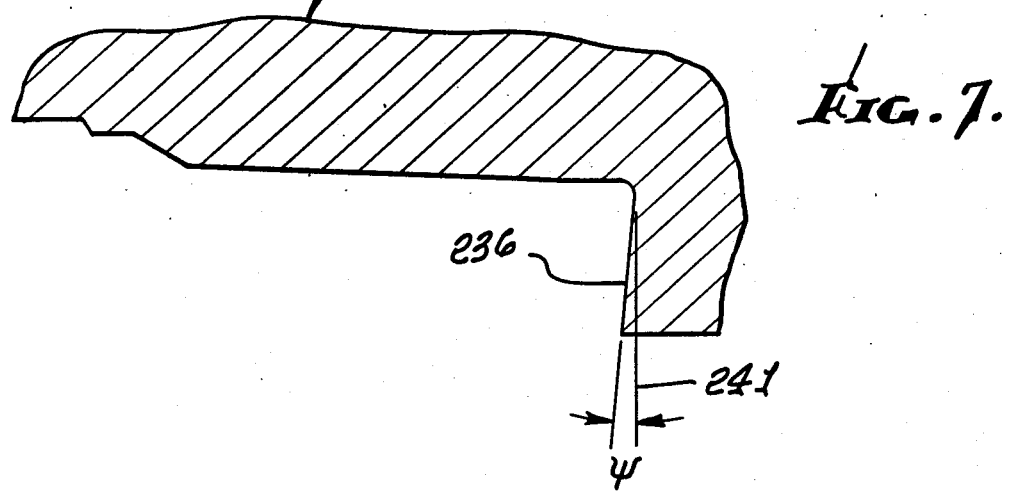
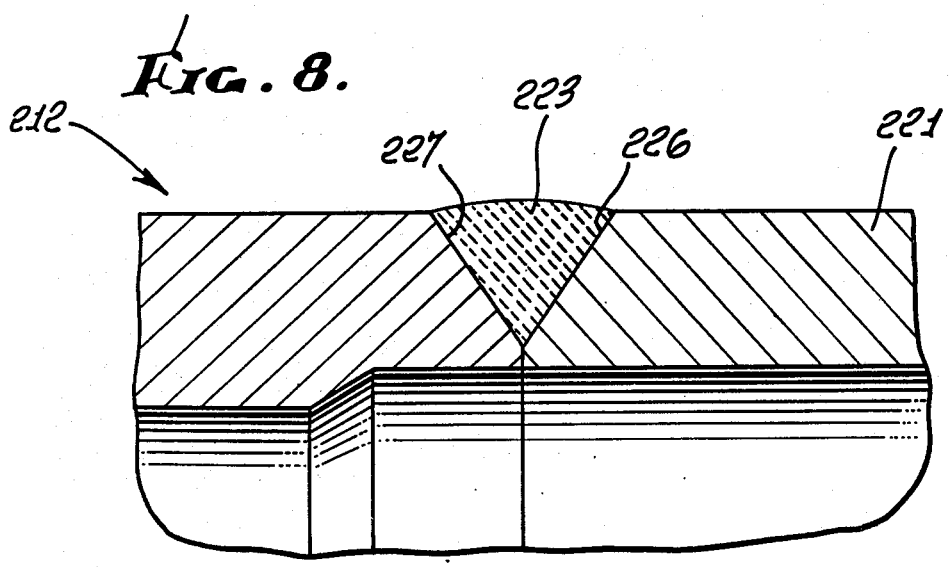

DOVETAIL CONNECTION FOR PIN AND BOX JOINTS

This is a continuation, of application Ser. No. 679,476, filed Apr. 22, 1976; now abandoned.

BACKGROUND OF THE INVENTION

This invention relates generally to thread connected joints as usable in oil well tubing, casing, line pipe and drill pipe (all of which will be referred to as pipe, for convenience). More particularly, it concerns a means for connecting joint pin and box members in a manner to prevent axial and radial separation of the members.

With increased concern for protection of our environment, it is becoming more important that tubular joint connections used in the oil industry be capable of performing with maximum security under all conditions characteristic of the operating tasks they are relied upon to fulfill. Basic fundamental technology required to meet these performances must be satisfied through all operating stress or strain levels. Today there are no tubular connections produced anywhere in the world which will meet these requirements through all operating stress or strain conditions characteristic of services to which they may be exposed. In most cases, margins of safety are inherently smaller as severity of performance increases. There is a need for a connection that will have mechanical integrity which will not be weakened by load stresses or strains induced by tension, compression, internal pressure, external pressure, torsion, bending, thermal variances, or any combination of these until the material itself has failed by limitation of metallurgical properties in rupture or fracture.

SUMMARY OF THE INVENTION

It is a major object of the invention to provide a pipe joint whose members are interlocked at both threads and annular shoulders and wherein the members cannot separate radially due to internal or external pressure; also, the members cannot separate due to axially applied tension or compressive loads, without plastically deforming one or both joint members in the area of thread or shoulder interlocking. Basically, the invention is embodied in a pipe joint including pin and box members defining an axis, and including:

(a) first and second pairs of interengaged threads on the respective members, the first pair of threads axially spaced from the second pair of threads, and (b) a first pair generally frusto-conical shoulders on the members located axially between said first and second pair of threads, said shoulders having dovetail interfit on make-up of the joint.

It is a further object to provide individual pin and box members characterized as forming a joint as described.

Further, and as will be seen, the joint may include a second pair of annular shoulders at the end of one of the members, such shoulders typically being closely spaced and frusto-conical to have dovetail interfit in the event of sufficient coining of the first pair of shoulders or make-up; and a third pair of frusto-conical closely spaced shoulders may be provided at the end of the other of the pin and box members to have dovetail interfit in the event of sufficient coining of the first pair of shoulders on joint make-up.

Further, the threads of the first and second pairs may have interengaged negative flanks, and positive flanks which remain disengaged.

These and other objects and advantages of the invention, as well as the details of illustrative embodiments, will be more fully understood from the following description and drawings, in which:

DRAWING DESCRIPTION

FIG. 1 is a section in an axial radial plane, through a pin member embodying the invention;

FIG. 2 is a section in an axial radial plane, through a box member embodying the invention;

FIG. 3 is a section in an axial radial plane through a pipe joint embodying the invention;

FIG. 4 is an enlarged fragmentary section on line 4 of FIG. 1;

FIG. 5 is an enlarged fragmentary section on lines 5 of FIG. 1;

FIG. 6 is an enlarged fragmentary section on line 6 of FIG. 2;

FIG. 7 is an enlarged fragmentary section on line 7 of FIG. 2; and

FIG. 8 is an enlarged fragmentary section on line 8 of FIG. 3.

DETAILED DESCRIPTION

Referring first to FIG. 3, a pipe joint 210 includes pin and box members 211 and 212, the joint defining an axis 213. Interengaged thread means on the members include first and second helical threading or threads 214 and 215, and third and fourth helical threads 214' and 215'. The first pair of threads 214 and 215 is axially spaced from the second pair of threads 214' and 215'; also the pair 214 and 215 is at a greater radius from axis 213 than the pair 214' and 215', forming a two-step configuration.

The threads 214 and 215 have semi-dove-tail interfit as at flank 216 on thread 214 engaged with flank 217 on thread 215. Similarly, flank 216' on thread 214' engages with flank 217' on thread 215', to form a semi-dove-tail interfit. The opposite flanks 218 and 219 on the pin and box, and flanks 218' and 219', are typically not interengaged, there being about 0.020 inches clearance therebetween on normal make-up.

The pin and box members 211 and 212 may be respectively welded to pipe members 220 and 221, as for example drill pipe or tubing or casing used in oil wells. Annular welds are shown at 222 and 223, in FIG. 3, as having triangular cross sections in axial radial planes. Beveled surfaces on the pin, box and pipe members, adjacent the welds, appear at 224–227.

The interengaged flanks 216 and 217, as well as flanks 216' and 217', define negative angles $\phi$ in axial radial planes, those angles being respectively measured from other planes 228 and 228' normal to axis 213, as is clear in FIGS. 1, 2, 5 and 6. Typically, and for best results, the angle $\phi$ may be about $-15°$. Flanks 218 and 219, and 218' and 219' may extend at negative angles $\Delta$ which are greater than $\phi$, and may typically be about 30° as measured from other planes 229 and 229' normal to the joint axis 213.

In accordance with an important aspect of the invention, the joint also includes generally annular and preferably frusto conical parallel shoulders 239 and 240 on the pin and box members, such shoulders having pressure or sealing interfit in axially spaced relation from and intermediate the first and second thread pairs; also, the shoulders define dovetails in axial radial planes, and the dovetail angularity may advantageously be positive as measured from a plane or planes normal to the joint axis. Accordingly, shoulders 239 and 240 block radial and axial separation of the pin and box members, and they form a tight seal. Such planes appear at 241 and 242 in FIGS. 5 and 6.

As shown in FIGS 1–3, a second pair of frusto-conical, parallel shoulders 235 and 236 may be respectively located at the end of the pin member and on the box member; and a third pair of frusto-conical, parallel shoulders 237 and 238 at the end of the box member and on the pin member. Shoulders 235 and 236 are spaced apart, as are shoulders 237 and 238, on normal make-up, the spacing being less than 0.020 inches and preferably 0.015 inches. Note the positive semi-dovetail angularity $\psi$ of the three pairs of shoulders, as measured from planes 241–243 normal to axis 13. For best results, angle $\psi$ may be about 5°.

As a result, upon make-up of the joint, the first pair of annular shoulders 239 and 240 initially come into pressural and sealing interengagement and in conjunction with the interlocked threads prevent radial separation of the joint members, and also prevent axial separation of the members. Should the axial make-up be excessive resulting in coining of shoulders 239 and 240, the second and third pairs of shoulders 235 and 236, and 237 and 238 will come into interengagement to assist in holding the pin and box members against radial and axial separation; i.e., the second and third shoulders act as safety means assuring positive interlocking and sealing of the pin and box members under all conditions of make-up in the field. Further, with the shoulder interlock as described, locking is provided throughout the connection, and the application of high make-up torque will have less tendency to separate the joint members as the shoulders coin or yield, because the adjacent interlocked threads resist the tendency of the shoulders to climb over one another to separate the joint members. This advantage is in addition to the resistance provided by the interlocked shoulders to fluid pressure induced separation of the members.

I claim:
1. In a pipe joint including pin and box members defining an axis,
  (a) first and second pairs of interengaged threads on the respective members, the first pair of threads axially spaced from the second pair of threads, and
  (b) a first pair of general frusto-conical shoulders on the members located axially between said first and second pairs of threads, said shoulders having semi-dovetail interfit on make-up of the joint,
  (c) said threads of said first and second pairs having semi-dovetail interengaged flanks which are negatively angled in axial radial planes, and relative to planes normal to said axis, said flanks on the pin member facing away from the end of the pin member, and said frusto-conical shoulders being positively angled in axial radial planes, and relative to planes normal to said axis,
  (d) said joint including a second pair of annular shoulders on the respective members which extend in substantially parallel, face-to-face, proximate but spaced relation on normal make-up of the joint, said second pair of shoulders having semi-dovetail interfit in the event of sufficient coining of the shoulders of the first pair on joint make-up, said interfit being positively angled in axial radial planes and relative to planes normal to said axis.

2. The joint of claim 1 wherein the first pair of threads has greater radial spacing from said axis than the second pair of threads to define two-step threading.

3. The joint of claim 1 wherein said shoulders of said second pair are respectively at the end of one of said members and on the other member.

4. The joint of claim 3 including a third pair of annular shoulders at the end of the other of said members and on said one member, said third shoulders extending in parallel face-to-face, proximate but spaced relation on normal make-up of the joint.

5. The joint of claim 4 wherein the space between said third shoulders is less than about 0.020 inches.

6. The joint of claim 5 wherein said space is about 0.015 inches.

7. The joint of claim 3 wherein the space between said second shoulders is less than about 0.020 inches.

8. The joint of claim 7 wherein said space is about 0.015 inches.

9. The joint of claim 1 wherein said threads of said first and second pairs have interengaged negatively angled flanks, said frusto-conical shoulders being positively angled.

10. The joint of claim 9 wherein said threads of said first and second pairs have opposite flanks which remain disengaged.

11. The joint of claim 1 wherein said first shoulders are angled at about 5° relative to planes normal to said axis.

12. In a pipe joint including pin and box members defining an axis,
  (a) first and second pairs of interengaged threads on the respective members, the first pair of threads axially spaced from the second pair of threads, and
  (b) a first pair of generally frusto-conical shoulders on the members located axially between said first and second pairs of threads, said shoulders having semi-dovetail interfit on make-up of the joint,
  (c) said threads of said first and second pairs having semi-dovetail interengaged flanks which are negatively angled in axial radial planes, and relative to planes normal to said axis, said flanks on the pin member facing away from the end of the pin member, and said frusto-conical shoulders being positively angled in axial radial planes, and relative to planes normal to said axis,
  (d) said joint including a second pair of annular shoulders at the end of one of said members and on the other member, said second shoulders extending in parallel, face-to-face, proximate but spaced relation on normal make-up of the joint, said second shoulders being frusto-conical to have semi-dovetail interfit in the event of sufficient coining of the first pair of shoulders on joint make-up, said interfit being positively angled in axial radial planes and relative to planes normal to said axis.

13. The joint of claim 12 wherein said second shoulders are angled at about 5° relative to planes normal to said axis.

14. In a pipe joint including pin and box members defining an axis,
  (a) first and second pairs of interengaged threads on the respective members, the first pair of threads axially spaced from the second pair of threads, and
  (b) a first pair of generally frusto-conical shoulders on the members located axially between said first and second pairs of threads, said shoulders having semi-dovetail interfit on make-up of the joint, (c) said threads of said first and second pairs having semi-dovetail interengaged flanks which are negatively angled in axial radial planes, and relative to planes normal to said axis, said flanks on the pin member facing away from the end of the pin member, and said frusto-conical shoulders being positively angled in axial radial planes, and relative to planes normal to said axis, (d) said joint including a second pair of annular shoulders at the end of one of said members and on the other member, said second shoulders extending in parallel, face-to-face, proximate but spaced relation on normal make-up of the joint, (e) said joint including a third pair of annular shoulders at the end of the other of said members and on said one member, said third shoulders extending in parallel, face-to-face, proximate but spaced relation on normal make-up of the joint, said third shoulders being frusto-conical to have semi-dovetail interfit in the event of sufficient coining of the first pair of shoulders on joint make-up, said interfit being positively angled in axial radial planes and relative to planes normal to said axis.

15. The joint of claim 14 wherein said third shoulders are angled at about 5° relative to planes normal to said axis.

* * * * *